Aug. 29, 1950     R. E. FEARON     2,520,677
MAGNETIC GRADIENT MEASUREMENT
Filed June 19, 1946     2 Sheets-Sheet 2
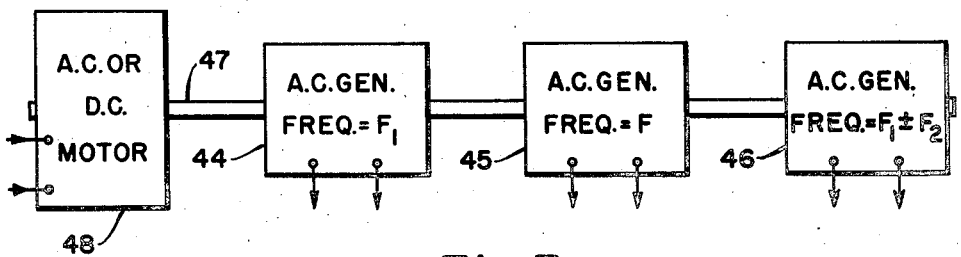
Fig. 3
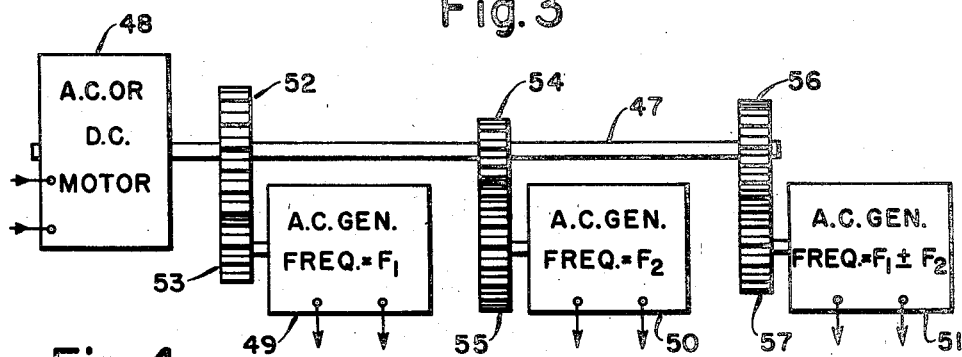
Fig. 4
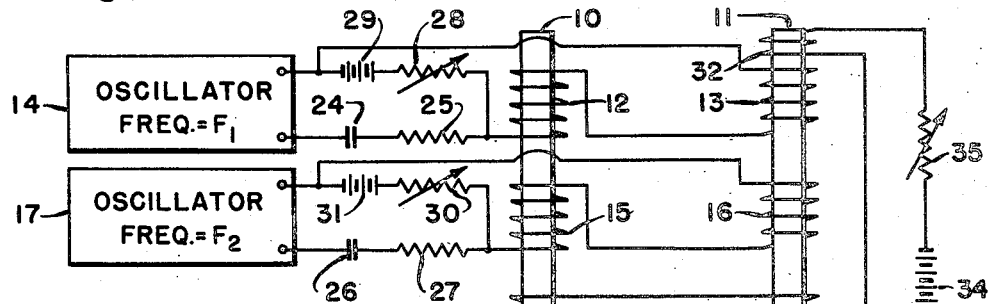
Fig. 5
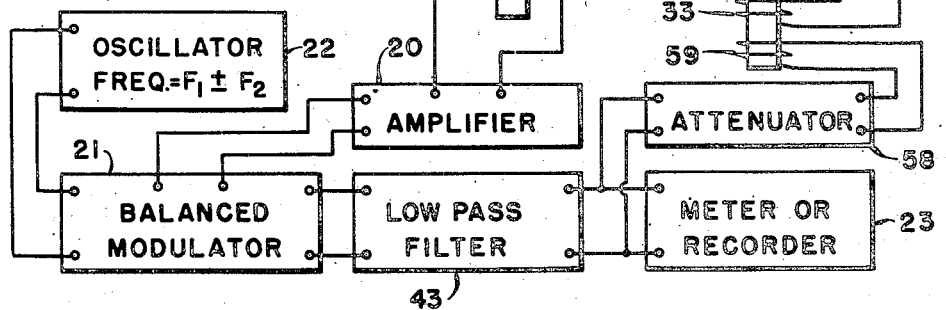
INVENTOR.
ROBERT E. FEARON
BY
Newell Pottof
ATTORNEY Patented Aug. 29, 1950

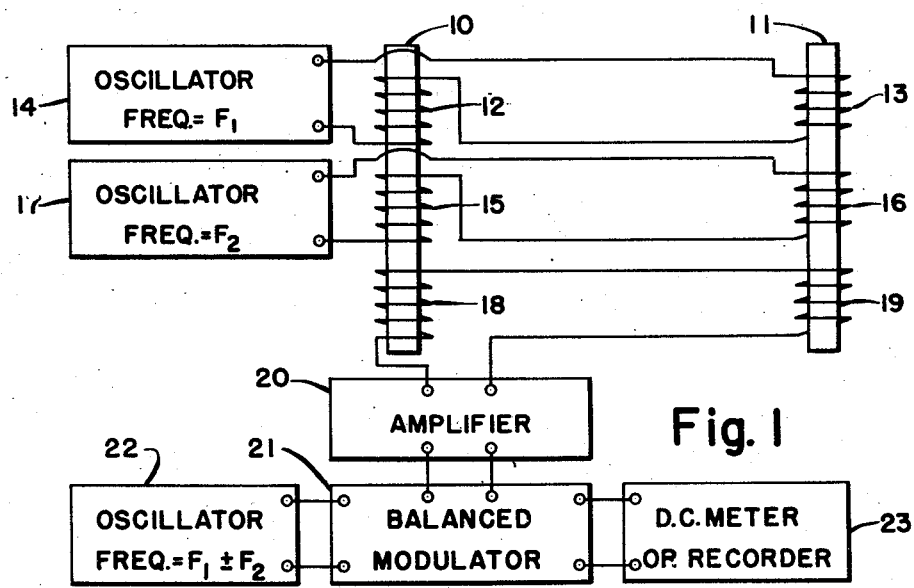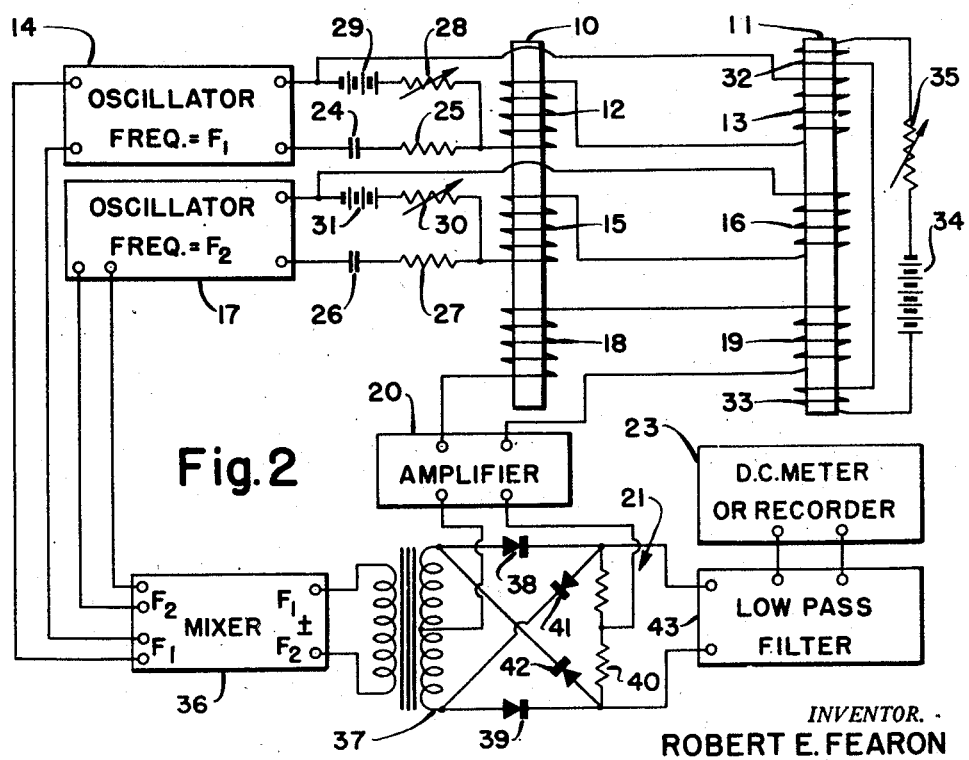

2,520,677

UNITED STATES PATENT OFFICE 2,520,677

MAGNETIC GRADIENT MEASUREMENT

Robert E. Fearon, Tulsa, Okla., assignor to Stanolind Oil and Gas Company, Tulsa, Okla., a corporation of Delaware Application June 19, 1946, Serial No. 677,877

13 Claims. (Cl. 175—183)

This invention relates to the measurement of magnetic fields, and is directed particularly to a method and apparatus for measuring the gradients of such fields. Although it is especially suitable for and will be described with reference to measuring space gradients of the earth's magnetic field for such purposes as geophysical exploration, this invention should not be considered as of such limited utility. As will become apparent from the detailed description following, it is applicable also to measuring gradients of nearly any type of steady or slowly varying magnetic field that is not confined to too small a volume of space.

It has long been known that anomalies in the earth's magnetic field are often associated with mineral deposits and with subsurface geological structures. This fact forms the basis of one of the common methods of exploration for such minerals as oil and gas, in the course of which measurements of the total intensity of the earth's field, or of selected components thereof, have been carried out over wide areas. While the data so accumulated have been highly useful for certain purposes, their value has been limited by such factors as lack of control of the depth and area of investigation. In other words, the interpretation of the data has generally not been extended to the drawing of definite conclusions as to the depth and extent of a body or structure responsible for an observed anomaly.

More recently, however, it has been demonstrated that a knowledge of the space gradients of the earth's field can be of very great assistance in the interpretation of magnetic data. Specifically, under certain circumstances the magnetic-gradient data allow estimates of depth and area factors which could not otherwise be evaluated.

As far as useful accuracy is concerned, magnetic-intensity measurements and magnetic-gradient measurements are in different categories. Due to a number of extraneous influences the intensity measurements are subject to large variations. Although some of these variations are complex, they are sufficiently regular in nature that they can be corrected or allowed for. However, other disturbances such as those traceable to magnetic storms, instrument drifts, stray fields, and the like are so erratic and irregular that it is impossible to eliminate completely their effect on the observations. Consequently intensity readings are always considered as possibly in error by 2 to 5 gammas, and such readings have necessarily been accepted as adequate data for geophysical mapping, on the theory that more exact readings would be rendered meaningless by these random disturbances. Methods and apparatus for making magnetic-intensity measurements with this limited accuracy have been available and in use for several years.

Magnetic space gradients, on the other hand, appear to be much less affected by the various disturbing factors that influence the intensity readings. As a result, a gradient-measuring instrument sensitivity of a different order of magnitude can be used to advantage. To a first approximation the objective to be attained in an instrument for gradient measurements is to detect intensity differences as small as 0.1 gamma, or less. Assuming the spacing between measurement points to be one meter, this is equivalent to measuring a space gradient as small as 0.1 gamma per meter, or larger gradients to within 0.1 gamma of their true values.

Progress toward the achievement of such a sensitivity has been made in the iron induction gradiometer described by J. H. Jones in Geophysics for January, 1943, at page 23. It is there shown analytically that the exposing of an iron bar excited by an alternating magnetic flux to a steady magnetic field produces at least two effects which can be utilized to measure this field. Into the voltage of a secondary pickup coil surrounding the bar even-order harmonics are introduced when only odd-order harmonics were present before; and the amplitude of the fundamental frequency component in the secondary is altered. Gradient measurements are made by using two such identical bars with their secondaries connected in series opposition and balanced initially so that their outputs cancel. Then upon the exposure of one bar to a slightly different field strength, as by moving it with respect to the other in a non-uniform field, the balance is disturbed so as to give a resultant output proportional to the change in field strength. The quotient of change in field strength by the distance of movement is, of course, the desired magnetic field gradient. Preferably, either the change in level of the fundamental or of the first even harmonic frequency is observed, as these two constitute the major components of the unbalance output.

If an attempt is made to apply these principles to a practical field instrument for gradient measurements, certain factors arise that were not considered in the theoretical treatment. Particularly is it to be noted that the sensitivity is, by theory, directly proportional to the minimum signal voltage which is considered detectable. As the unbalance voltage of the secondary coils is very small, the gain of the amplifier used to detect it must be quite high. In fact, to achieve the desired sensitivity of 0.1 gamma, it will be found that the amplification must be pushed practically to the ultimate limit which is imposed by the noise of thermal agitation in the amplifier input circuit.

Due to this extremely high gain, when the amplifier is tuned to the fundamental exciting frequency for detecting changes thereof, difficulties invariably arise from direct cross-feed or coupling between the amplifier and the exciting-voltage source. If an attempt is made to obviate these by observing changes in one of the harmonics, such as the first, it is found that the presence of harmonics in the source or their generation in any non-linear portion of the circuits ahead of the amplifier input masks and is inseparable from the harmonic generation in the bars which it is desired to measure. The net result is that the usable sensitivity of the iron induction gradiometer as it works out in practice is so far below the theoretical possibilities and the actual needs as to render it of small value for most geophysical-prospecting purposes.

Accordingly, it is a primary object of my invention to provide a novel and improved method and apparatus for magnetic-gradient measurement which, by avoiding the limitations on sensitivity just described, approaches the theoretical limit of sensitivity inherent in the iron induction type of gradiometer. Another object is to provide for magnetic-gradient measurements a method and apparatus in which the detection of significant signals is limited strictly to those generated in the bars themselves due to the surrounding magnetic field. A further object is to provide such a method and apparatus having novel and improved excitation of the iron bars whereby new frequencies are generated which are alone significant of the magnetic field being measured. A still further object is to provide a method and apparatus of this type having a filtering and recording system capable of very high discrimination against noise and undesired frequencies. Still another object is to provide a method and apparatus for magnetic-gradient measurement employing a null or feedback type of indicating system by which the readings obtained are made relatively insensitive to changes in the amplification. Other objects, uses, and advantages of the invention will become apparent as the description thereof proceeds.

In brief, these objects are accomplished and a satisfactorily high sensitivity is attained in an iron induction gradiometer using simultaneously two different frequencies of excitation of the bars. Both by theoretical analysis and by experiment I have found that, not only do both of these fundamental frequencies and their harmonics appear in the secondary pickup coils, but certain modulation product frequencies such as the sum and the difference of the two fundamental frequencies are also present. Like the other frequencies, these modulation frequencies are influenced by the presence of an external magnetic field affecting the bars and can be used to indicate its strength. But unlike all other frequencies present at the amplifier input, these modulation frequencies are unique in being generated only in the iron bars. From their nature they can only appear at a place where both fundamental frequencies occur simultaneously; and in a properly designed system the iron of the bars is the first and only place ahead of the pickup coils connected to the amplifier input where both frequencies are present. Therefore, by tuning the amplifier as sharply as possible to one of these modulation frequencies, all the difficulties due either to direct cross-feed of the fundamental or of harmonics from the source or to the generation of harmonics at places other than in the bars are largely avoided.

For a better understanding of the principles of this invention, drawings illustrating certain embodiments thereof are appended hereto and made a part of this application. However, as these drawings are for illustrative purposes only, the scope of the invention should not be considered as limited thereto. In these drawings, in which the same reference numeral in different figures indicates the same or a corresponding part:

Figure 1 is a circuit diagram, partly in block form, showing the relationship of the basic elements of the invention;

Figure 2 is a circuit diagram of an embodiment having added details and control means desirable for a field instrument;

Figure 3 is an alternative power supply furnishing the multiple frequencies used in the invention;

Figure 4 is a modification of the power supply of Figure 3; and

Figure 5 is a circuit diagram of an embodiment having a null-type indicating system.

Referring now to Figure 1, two ferromagnetic bars 10 and 11 having appropriate magnetic properties, and as nearly identical as possible, are provided, respectively, with primary or exciting windings 12 and 13 connected in series. To these windings power of a frequency $f_1$ is supplied from an oscillator 14 or similar stable source of alternating current. A second pair of exciting coils 15 and 16 on bars 10 and 11, respectively, are similarly connected in series and supplied with power of frequency $f_2$ from a second oscillator 17.

Also surrounding bars 10 and 11, respectively, are a pair of pickup or secondary windings 18 and 19. These are connected in series opposition and coupled to the input of a high-gain amplifier 20, which is tuned as sharply as possible to that one of the two modulation frequencies, $(f_1+f_2)$ or $(f_1-f_2)$, which is to be detected. The output of amplifier 20 is fed to a balanced or ring modulator network 21, which is supplied also with a carrier voltage of substantially constant amplitude and of the modulation frequency being detected from an independent source or oscillator 22.

The function of network 21 is to discriminate very sharply against all but the single modulation frequency, which it does by multiplying together any two input frequencies, giving an output proportional to their product. If the two frequencies are different, their product will be alternating current, while if they are the same, it will be direct current of a polarity and amplitude depending on their respective amplitudes and phase difference. In the present system the chosen modulation frequency, $(f_1+f_2)$ or $(f_1-f_2)$, produces a direct-current output from modulator 21, which is recorded or indicated by a direct-current meter or recorder 23. As all other frequencies produce an alternating current at the output of modulator 21, to which meter 23 is insensitive, they are not recorded. It is thus seen that the system described is one giving very sharp discrimination against unwanted frequencies while a single desired frequency is being recorded.

In some instances it may be preferred to tune oscillator 22 slightly off the chosen modulation frequency, so that network 21 produces a very low frequency alternating-current output. This may be applied to direct-current meter or recorder 23 and the amplitude of the swing taken as the significant indication.

In accordance with the theory outlined briefly above, when bars 10 and 11, exposed to a static magnetic field, are thus simultaneously excited by alternating magnetomotive forces of respective frequencies $f_1$ and $f_2$, the voltages appearing across each of the secondary pickup coils 18 and 19 have several components. Of these the most prominent are the two fundamentals, the first harmonics of each, and the sum and difference modulation frequencies, any one of which is affected by the external field inducing the static flux in the iron. However, for the reasons stated, all frequencies except one of the modulation frequencies are disregarded, as they alone are unique indicators of this flux.

If the two bars and their respective exciting and pickup coils are sufficiently near to being identical, and if they are both exposed to static fields of the same strength, then because of the series-opposed connection of coils 18 and 19 the modulation frequencies cancel out or balance each other ahead of the input to amplifier 20. If the fields are not of the same strength, then the amplitude of unbalance of modulation frequency becomes a measure of their difference. Two methods of measurement are possible: the quotient of the voltage difference by the distance between bars may be taken as indicating the gradient directly; but it is preferred to make two such measurements at two bar spacings and take the quotient of change in differential voltage by the change in spacing. In the latter case any slight inequalities of the bars or coils do not appreciably affect the result.

Although the foregoing description and Figure 1 present the basic method and apparatus of the invention accurately, in an instrument designed for field use it has been found advantageous to provide the additional features and controls shown in Figure 2. Here the coupling of oscillator 14 to coils 12 and 13 is through a condenser 24 and resistor 25, while oscillator 17 is similarly coupled to coils 15 and 16 by condenser 26 and resistor 27. The values of resistors 25 and 27 and of condensers 24 and 26 are so chosen as to produce the desired amplitude of each frequency in the primary exciting coils. In parallel with the alternating current from oscillator 14, direct current adjusted by variable resistor 28 is supplied by battery 29, while a second direct-current component is similarly supplied in parallel with the power from oscillator 17 through variable resistor 30 from battery 31. The direct-current bias thus applied is preferably of a polarity and magnitude such as to produce in the exciting coils a steady magnetic field opposing or balancing as nearly as possible the external magnetic field. The bars are therefore operated at very close to zero static flux when balanced, for the reason that the curvature or non-linearity of their magnetization curve responsible for modulation-frequency generation is greatest for small flux values. To assist even further in approaching an exact balance and to a certain extent overcome slight inequalities of the bars or coils, one of the bars, such as bar 11, is equipped with a pair of auxiliary balancing windings 32 and 33, in series, supplied with current from a battery 34 through a variable resistor 35.

Instead of using a separate oscillator, such as oscillator 22 in Figure 1, to furnish carrier voltage of the chosen modulation frequency to network 21, a suitable reference signal for this purpose may be formed as shown in Figure 2 by taking signals directly from each of oscillators 14 and 17 and so combining them in a mixing circuit 36 as to produce either $(f_1+f_2)$ or $(f_1-f_2)$. As a number of well-known circuits will perform this mixing function, for example, one including a multiple-grid tube with each of the two frequencies applied to a separate grid, no further detailed description is here deemed necessary.

The ring or balanced modulator 21 is here shown in more detail. An input impedance 37, which may be a center-tapped transformer secondary, is connected through rectifiers 38 and 39 across a center-tapped output impedance or resistor 40. The diagonally opposite ends of impedances 37 and 40 are connected through rectifiers 41 and 42 of reverse polarity to rectifiers 38 and 39. A direct-current voltage is produced by this circuit across impedance 40 proportional to the product of the two input voltages, the carrier input voltage being applied across impedance 37, and the variable voltage to be detected being introduced at the center points of impedances 37 and 40. As this output may also contain alternating-current components which should not be transmitted to recorder 23, these may be removed by low-pass filter 43 which passes essentially only direct current.

The method of operation is generally similar to that described in connection with Figure 1. With bars 10 and 11 in one position and excited by the two alternating magnetizing forces of frequencies $f_1$ and $f_2$, the magnetic bias furnished by the direct current of batteries 29, 31, and 34 is adjusted to produce a minimum or zero signal input of the modulation frequency to amplifier 20. Then the bar spacing is changed by a measured distance, and the amplitude of the modulation frequency proportional to the unbalance of the system is recorded. From these measurements the gradient is readily computed, as has been previously pointed out.

An alternative and often advantageous manner of making the readings is to use meter 23 as a null instrument and rebalance the system after changing the bar spacing. The amount of readjustment of the steady magnetic bias is then a measure of the change in magnetic field strength in the bars produced by the bar movement.

A means possessing certain advantages for generating the various alternating currents needed in this invention is shown in Figure 3. Here alternating-current generators 44, 45, and 46 are all mounted on the same shaft 47 driven by a suitable prime mover such as motor 48. By making these generators of the multiple-pole type and providing different appropriate number of poles in each, $f_1$, $f_2$, and $(f_1+f_2)$, or $(f_1-f_2)$, are automatically maintained in a suitable frequency and phase relation to each other. It is then necessary to operate motor 48 within a speed range such that the modulation frequency $(f_1+f_2)$ or $(f_1-f_2)$ falls within the band passed by the tuned circuits of amplifier 20. Small speed variations within this range are without effect, the frequency and phase relations of the various currents being determined only by the construction and not by the speed of operation.

The apparatus of Figure 4 is quite similar to that of Figure 3, except that generators 49, 50, and 51 may all have the same number of poles. Their speed ratios and thus their frequency and phase relations are determined by the gearing to shaft 47 driven by motor 48. That is, gears 52, 53 drive generator 49 at a speed to produce $f_1$, while gears 54, 55 drive generator 50 at a different speed to produce $f_2$, and gears 56, 57 drive generator 51 at a still different speed to produce $(f_1+f_2)$ or $(f_1-f_2)$. As in Figure 3, the frequency and phase relationships are automatically maintained and the speed is required to be only approximately constant.

In Figure 5 is shown an embodiment of the invention having an automatic null or feedback type of recording or indicating circuit. This circuit is generally similar to that of Figure 2 except for the feedback or null arrangement. A portion of the direct-current output of filter 43 is diverted to an attenuator 58 which produces a very much reduced direct-current output proportional to that reaching recorder 23. This reduced current is applied to an additional balancing winding 59 on one of the bars, such as bar 11, in such a direction as to produce a magnetic flux therein reducing the flux difference between the bars.

The advantage of such an arrangement is that the exact amount of gain of amplifier 20 is rendered unimportant so long as it is quite high. What is recorded is a direct current proportional to the magnetic bias required to reduce the field gradient nearly to zero. Due to the presence of attenuator 58, the output of filter 43 can vary through appreciable values, easily recordable by meter 23, to produce this bias. However, due to the very high sensitivity and gain of amplifier 20, the variation of the bars from a condition of absolute balance needs to be only very small to produce the requisite balancing current. It will be apparent that the only effect of a reduction in sensitivity of amplifier 20 would be to increase slightly the possible percentage of error in the reading of meter 23, the absolute value of the indication being practically unaffected. The need for accurate calibration and frequent checking of amplifier 20, which is inherent in the embodiment of Figure 2, is here largely eliminated.

My invention having been described in terms of the foregoing specific embodiments, various modifications thereof will occur readily to those skilled in the art. Such of these modifications as make use of the principles of this invention are, although not specifically described herein, contemplated by and within the scope of the appended claims.

I claim:

1. The method of measuring differences in strength in a magnetic field which comprises the steps of disposing within said field a pair of spaced, substantially identical, magnetizable ferromagnetic members separated by a substantial air gap, whereby a static flux is induced in each of said members proportional to the strength of a component of said field at the location of each of said members, simultaneously and equally exposing each of said members to alternating magnetizing forces of two different frequencies, and measuring a function of the difference in flux in said two members of a modulation frequency of said two frequencies.

2. The method of measuring differences in strength in a magnetic field which comprises the steps of disposing within said field a pair of spaced, substantially identical magnetizable ferromagnetic members separated by a substantial air gap, simultaneously and equally exposing each of said members to alternating magnetizing forces of two different unrelated frequencies, deriving from the resultant fluxes in each of said members electric waves containing sum and difference modulation frequencies of said two frequencies, taking the difference between said electric waves produced at one of said members and the corresponding electric waves produced at the other of said members, amplifying the portion of said difference due to one of said modulation frequencies, and indicating the value of said portion whereby the space gradient causing unequal generation of said modulation frequencies may be determined.

3. The method of measuring the gradient of a magnetic field which comprises disposing at a first spacing in said field a pair of substantially identical, magnetizable, ferromagnetic members, simultaneously and equally exposing each of said members to alternating magnetizing forces of two different unrelated frequencies, deriving from the resultant flux in each of said members electric waves containing sum and difference modulation frequencies of said two frequencies, subtracting from said electric waves produced at one of said members the corresponding electric waves produced at the other of said members, producing a first indication of the amplitude of the difference of said waves of one of said modulation frequencies, repeating the foregoing steps at a second spacing of said members whereby a second indication is produced, and determining the quotient of the difference between said first and said second indications by the difference between said first and second spacings.

4. The method of measuring differences in strength in a magnetic field which comprises the steps of exposing to said field a pair of spaced, substantially identical, magnetizable, ferromagnetic members whereby a static flux is induced in each of said members proportional to the strength of said field at each of said members, equally and simultaneously inducing alternating fluxes in said members by magnetizing forces of two different unrelated frequencies, deriving electric waves proportional to the time rate of change of the resulting flux in each of said members and containing components which are modulation frequencies of said unrelated frequencies, subtracting said electric waves from one member from those from the other, amplifying a modulation frequency component of the resultant of said subtracted waves, producing a direct current proportional to the amplitude of said modulation frequency component, and indicating said direct current.

5. The method of measuring the gradient of a magnetic field which comprises the steps of exposing to said field a pair of spaced substantially identical, magnetizable, ferromagnetic members, substantially balancing the static flux in each of said members due to said field by an equal and opposite static flux, equally and simultaneously inducing fluxes in said members by alternating magnetizing forces of two different unrelated frequencies, changing the spacing of said members whereby the static flux balance is disturbed, deriving from the resultant fluxes in each of said members electric waves proportional to the time rate of change of said fluxes and having components of a modulation frequency of said unrelated frequencies, subtracting said waves for one member from those for the other of said members, measuring the amplitude of a modulation frequency component of the resulting differential wave, and forming the quotient of said amplitude by the change in said spacing.

6. The method of measuring the gradient of a magnetic field comprising the steps of exposing to said field a pair of spaced, substantially identical, magnetizable ferromagnetic members, substantially balancing the static flux in said members due to said field by an equal and opposite flux, equally and simultaneously inducing fluxes in said members by alternating magnetizing forces of two different unrelated frequencies, deriving from the difference in resultant fluxes in said members electric waves containing sum and difference modulation frequencies of said two frequencies, amplifying one of said modulation frequencies, producing and indicating a direct current proportional to the amplitude of said modulation frequency, attenuating a portion of said direct current, producing from said attenuated portion a magnetic flux in one of said members tending to reduce to a small value the difference of static flux in said members, changing the spacing of said members, and forming the quotient of the resulting change in amplitude of said direct current by the change of said spacing.

7. Apparatus for measuring the gradient of a magnetic field comprising a pair of spaced, substantially identical, meagnetizable, ferromagnetic members separated by a substantial air gap, means for applying equally and simultaneously to said members alternating magnetizing forces of two different frequencies whereby alternating fluxes are induced therein, pickup windings surrounding each of said members and connected in series opposition, and means connected to said pickup windings for indicating the difference in amplitude in said windings of that component of voltage induced therein of a frequency equal to a modulation frequency of said two frequencies.

8. Apparatus for measuring the gradient of a magnetic field comprising a pair of spaced, magnetizable ferromagnetic members separated by a substantial air gap, a first means for applying to said members a static and an alternating magnetizing force of a first frequency, a second means for applying to said members a second static and a second alternating magnetizing force of a second frequency different from and unrelated to said first frequency, means for inducing an adjustable additional static flux in one of said members, means associated with each of said members for producing a voltage proportional to the time rate of change of the flux in said member, and means connected to said voltage producing means for indicating the difference in amplitude of that component of said voltage of a frequency equal to a modulation frequency of said first and second frequencies.

9. Apparatus for measuring the gradient of a magnetic field comprising a pair of substantially identical, magnetizable, ferromagnetic members, means for simultaneously and equally inducing in said members alternating fluxes by applying thereto magnetizing forces of two different unrelated frequencies, means for inducing in each of said members a static flux equal and opposite to the flux due to said field surrounding said members, means associated with each of said members for producing a voltage proportional to the time rate of change of flux in said member, said voltage having components of frequencies corresponding to sum and difference modulation frequencies of said two frequencies, means connected to said voltage producing means for amplifying the difference between the amplitudes of one of said modulation frequencies respectively associated with said members, means connected to said amplifying means for producing a direct current proportional to the amplitude of said difference, and means coupled to said current producing means for indicating said current.

10. Apparatus for measuring the gradient of a magnetic field comprising a pair of spaced, substantially identical, magnetizable, ferromagnetic members, a first pair of coils surrounding said members and connected to a first source of alternating current, a second pair of coils surrounding said members and connected to a second source of alternating current of a frequency different from and unrelated to the frequency of said first source, means for reducing the static flux in said members substantially to zero, a pair of differentially connected pickup coils surrounding said members, means connected to said pickup coils for amplifying the differential voltage component in said pickup coils of a frequency equal to a modulation frequency of said first and second sources, means connected to said amplifying means for producing a direct current proportional to the amplitude of said modulation frequency component, and means coupled to said current producing means for indicating said direct current.

11. Apparatus for measuring the gradient of a magnetic field comprising a pair of spaced, substantially identical, magnetizable, ferromagnetic members, a first pair of windings surrounding said members and connected to a first source of alternating current, a second pair of windings surrounding said members and connected to a second source of alternating current of a different frequency from said first source, means for reducing the resultant static flux in said members substantially to zero, a pair of differentially connected pickup windings surrounding said members, means connected to said windings for amplifying the differential voltage component in said windings of a frequency equal to a modulation frequency of said two sources, means connected to said amplifying means for producing a direct current proportional to the amplitude of said voltage component, means coupled to said current producing means for indicating said current, and means in parallel with said indicating means for utilizing a portion of said current to reduce the difference in static flux induced in said members substantially to zero.

12. Apparatus for measuring the gradient of a magnetic field comprising a pair of substantially identical, magnetizable, ferromagnetic members, a first pair of windings surrounding said members and connected to a first source of alternating curent, a second pair of windings surrounding said members and connected to a second source of alternating current of a frequency different from and unrelated to the frequency of said first source, means for reducing the static flux in said members substantially to zero, a pair of differentially connected pickup windings surrounding said members, means connected to said windings for amplifying that component of the differential voltage in said windings of a frequency equal to a modulation frequency of said first and second sources, means connected to said sources for generating a voltage of substantially constant amplitude and of a frequency equal to said modulation frequency, means coupled both to said amplifying means and to said generating means for forming a signal proportional to the electrical product of said amplified modulation frequency voltage component and said constant amplitude voltage, and means connected to said signal forming means for indicating the amplitude of said signal.

13. Apparatus for measuring the gradient of a magnetic field comprising a pair of substantially identical, magnetizable, ferromagnetic members, a first pair of windings surrounding said members for applying magnetizing force of a first frequency thereto, a second pair of windings surrounding said members for applying magnetizing force of a second frequency thereto, means for reducing the static flux in said members substantially to zero, a pair of differentially connected pickup windings surrounding said members, means connected to said pickup windings for amplifying that component of the differential voltage in said windings of a frequency equal to a modulation frequency of said first and second frequencies, means coupled to said amplifying means for forming a signal proportional to the electrical product of said modulation frequency component by a substantially constant voltage of the same frequency, means connected to said signal forming means for indicating the amplitude of said signal, a rotary prime mover and coupled thereto and to each other a first generator connected to said first pair of windings for supplying power of said first frequency thereto, a second generator connected to said second pair of windings for supplying power of said second frequency thereto, and a third generator connected to said product signal forming means for supplying power of said modulation frequency thereto.

ROBERT E. FEARON.

REFERENCES CITED

The following references are of record in the file of this patent:

UNITED STATES PATENTS

| Number | Name | Date |
| --- | --- | --- |
| 2,379,716 | Hull | July 3, 1945 |
| 2,406,870 | Vacquier | Sept. 3, 1946 |
| 2,407,202 | Vacquier | Sept. 3, 1946 |
| 2,425,180 | Fay | Aug. 5, 1947 |
| 2,444,726 | Bussey | July 6, 1948 |